United States Patent [19]
Perkins

[11] Patent Number: 5,310,294
[45] Date of Patent: May 10, 1994

[54] WIRE-PULLER APPARATUS

[76] Inventor: Robert E. Perkins, 2 Kelly La., Pisgah Forest, N.C. 28768

[21] Appl. No.: 67,534

[22] Filed: May 25, 1993

[51] Int. Cl.⁵ .............................................. B23B 51/00
[52] U.S. Cl. ........................ 408/226; 254/134.3 FT; 408/227
[58] Field of Search .............. 254/134.3 FT; 408/226, 408/227, 230; 7/158

[56] References Cited

U.S. PATENT DOCUMENTS

| | | |
|---|---|---|
| 597,750 | 1/1898 | Smith . |
| 839,461 | 12/1906 | Eastman ............................... 408/226 |
| 3,697,188 | 3/1988 | Pope ..................................... 408/230 |
| 4,525,111 | 6/1988 | Gutsche .............................. 408/226 |
| 5,149,231 | 9/1992 | Bowling .............................. 408/227 |

Primary Examiner—Daniel W. Howell
Attorney, Agent, or Firm—Joseph T. Guy, Jr.

[57] ABSTRACT

An improved apparatus for pulling a wire through a pre-drilled hole is detailed. The apparatus comprises a pair of opposing arms which reversibly grasp the wire. The opposing arms are attachable to a rod which is capable of mating with a rod or drill bit. The rod or drill bit is pulled through the hole which, in turn, pulls the wire through the same hole.

15 Claims, 6 Drawing Sheets

WIRE-PULLER APPARATUS

BACKGROUND OF THE INVENTION

Electricians are frequently required to install a wire into a pre-existing wall. To accomplish this task a hole is typically drilled and the wire is then "snaked" through the holes or series of holes. This method is inefficient and time consuming since the wire frequently becomes coiled within the cavity defined by the wall boards and wall support studs.

It is therefore desirable to attach the wire directly to the cutting element prior to removing the cutting element from the series of holes. With the wire attached the cutting element can be withdrawn from the hole which pulls the wire through.

Drill bits which are useful to accomplish this task are provided in U.S. Pat. No. 597,750 and 3,697,188. The drill bits which are suitable for the task require the electrician to insert the wire, or a leader, through a hole in a drill bit and twist the wire to insure that the wire does not become disengaged within the interior of the wall. This is cumbersome and especially difficult with large wire as typically used for household wiring and the like.

There has been a long felt need in the art for an improved means for quickly pulling wire through a portion of a pre-existing wall.

SUMMARY OF THE INVENTION

It is an object of the present invention to provide an improved apparatus for installing a wire through a series of holes in a pre-constructed wall.

It is a further object of the present invention to provide an apparatus which can easily and reversibly grasp a wire to allow the operator to pull the wire through a predetermined path.

It is yet a further object of the present invention to provide a method for attaching a wire to a drill bit quickly and easily without undue bending or twisting of the wire.

It is a particular feature of the present invention that a single wire attachment means can be used with a series of drill bit sizes.

These and other advantages, as will become apparent from the following disclosure, are provided in a wire puller apparatus comprising:
 a cutting element;
 a wire attachment means capable of coupling with said cutting element;
 wherein said wire attachment means comprises a shaft with at least two opposing arms attached thereto;
 a means for reversibly engaging said opposing arms with an elongated object.

A particularly preferred embodiment of the present invention is provided in an elongated rod comprising a cutting end and an attachment end; said cutting end comprises a drill bit; said attachment end comprises a first arm and a second arm wherein said first arm and said second arm are opposing; said attachment end further comprises a closure means for reversibly influencing said first arm and said second arm into close proximity wherein an elongated object is grasped therebetween.

Yet another preferred embodiment of the present invention is provided in a wire puller apparatus comprising: a shaft capable of coupling with a cutting element; a pair of opposing arms attached to said shaft wherein said opposing arms grasp an elongated object when in close proximity and release said elongated object when in distant proximity; a closure element for influencing said opposing arms together.

DETAILED DESCRIPTION OF THE INVENTION

Throughout the following description similarly numbered elements refer to similar elements.

Figure 1:
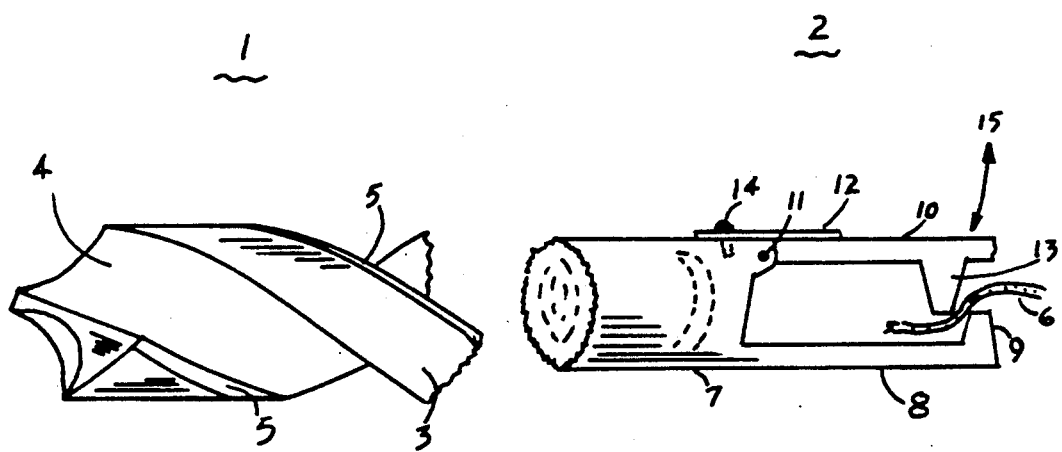
FIG. 1 is a fragmentary view of one embodiment of the present invention grasping a wire.

FIG. 1 shows a fragmentary view of one embodiment of the present invention. In FIG. 1, the wire-puller apparatus is shown with a cutting element, 1, and a wire attachment element, 2. The cutting element illustrated is a twist drill bit whose helical ridges or lands, 3, define helical grooves, 4, therebetween. It is well known in the art that the land, 3, comprises at least one sharp edge, 5, which cuts as the cutting element is turned. The sheared material is discharged via the helical grooves, 4. Most preferred is two sharp edges thereby allowing the cutting element to cut by turning clockwise or counter clockwise. The wire attachment element, 2, is capable of reversibly engaging a wire, 6, which is to be pulled through a pre-drilled hole. The wire attachment element, 2, comprises a shaft, 7, attached to the cutting element. Attached to the shaft opposite the cutting element is a fixed arm, 8, with at least one gripping element, 9. Opposing the fixed arm is a movable arm, 10, comprising at least one gripping element, 13. The movable arm is pivotally attached to the shaft by an axle, 11. During use the wire is engaged between the gripping element of the fixed arm and the gripping element of the movable arm. A closure means, 12, is rigidly attached to the shaft, 7, by an attachment means, 14. The attachment means, 14, can be any means known in the art for rigidly attaching two elements. Exemplary examples includes a rivet, screw, nail, weld, formed stud, and the like. It is also considered within the teachings that the closure means can be inserted into a void formed in the shaft. The closure means is preferably a strip of spring steel or the equivalent positioned to influence the movable arm towards the fixed arm. When the wire, 6, is engaged the closure means, 12, influences the movable arm, 10, towards the fixed arm, 8, thereby insuring that the wire is securely engaged. To disengage the wire, 6, the movable arm, 10, is pivoted on the axle, 11, away from the fixed arm, 8, in the direction of the arrow, 15, thereby stressing the closure means. After the wire is removed the closure means influences the movable arm into operative contact with the fixed arm. It is understood that the fixed arm can be replaced with a second movable arm and associated closure means without detrimental effect.

Figure 2:
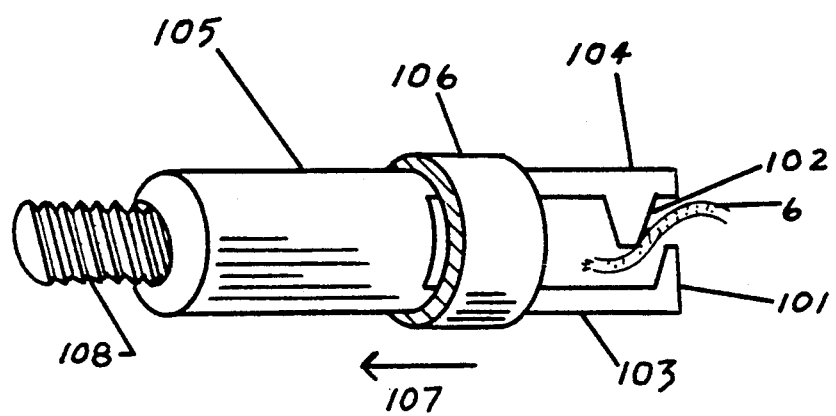
FIG. 2 shows a view of an embodiment of the present invention with a sleeve closure means.
Figure 6:
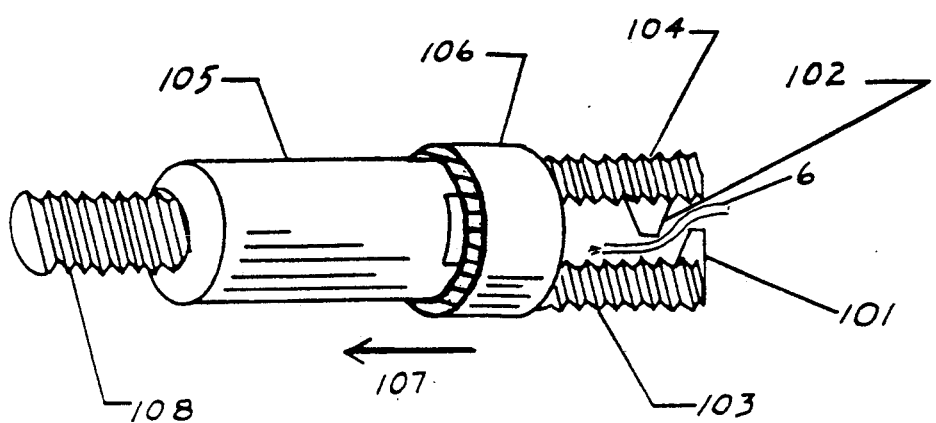
FIG. 6 shows an embodiment having threaded arms and an internally threaded sleeve.

FIG. 2 shows another embodiment of the wire attachment element of the present invention wherein the wire, 6, is engaged by a first gripping means, 101 and an opposing second gripping means, 102. The first gripping means is attached to a first arm, 103, and the second gripping means is attached to a second arm, 104. Both arms are attached to a shaft, 105. At least one of the arms is pivotally attached to a shaft, 105. A sleeve, 106, is provided which forces the opposing arms into operative contact with the wire, 6. To disengage the wire the sleeve is moved in the direction of arrow 107, thereby allowing the first and/or second gripping means to pivot away from the wire thereby disengaging the wire. The sleeve is of a suitable inner diameter and construction to resistively slide from over the shaft to an operative position over the first and second arm. It is preferable that the sleeve can be slid from the shaft to the arms and back with reasonable ease with only human hands. It is also preferably that the sliding motion be sufficiently resistive that the sleeve will remain in location after placement in a particular position by the operator. This can be accomplished by a sleeve comprising a rubber interior, for example. A particularly preferred embodiment shown in FIG. 6 comprised threads on the exterior of the shaft and arms and matching threads on the interior of the sleeve. In this manner the sleeve can engage the arms by simply twisting the sleeve while holding the shaft motionless. A particularly preferred method would be to grasp the two opposing arms between the thumb and first digit of one hand while turning the sleeve with the other hand. Yet another suitable sleeve is a flexible "O" ring which can be slid over the shaft and opposing arms. A male threaded rod, 108, is provided on the shaft opposite the gripping means for attaching the wire attachment element to a female threaded bore of a cutting element (not shown). It is understood that the threaded rod is not present if the wire attachment element and the cutting element are of a unified construction. It is also constructed that the male threaded rod could be attached to the cutting element and a mating female bore could be integral to the gripping means.

Figure 3:
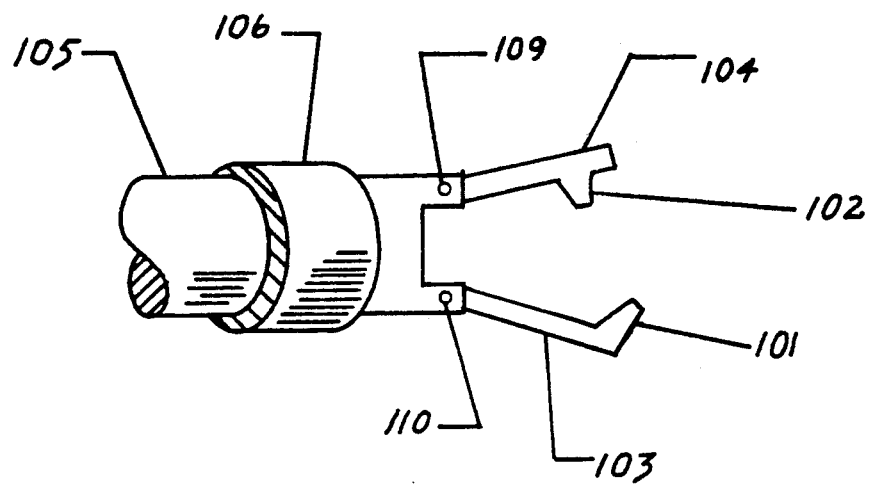
FIG. 3 shows a view of an embodiment with a sleeve closure means and the opposing arms separated for disengaging the wire.

FIG. 3 shows a wire attachment element similar to that shown in FIG. 2 wherein the wire is not engaged and not shown. The sleeve, 106, is moved in a position which does not obstruct the pivoting of the first arm, 103, and the second arm, 104. The first arm is pivotally attached to the shaft by a first axle, 109, and the second arm is pivotally attached to the shaft by a second axle, 110. It is understood that one arm could be a fixed arm and rigidly attached to the shaft without detrimental effects.

Figure 4:
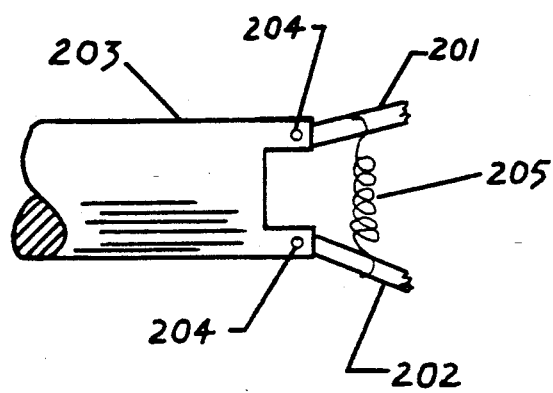
FIG. 4 shows a view of an embodiment with a spring closure means.

FIG. 4 shows an embodiment of the present invention wherein the first arm, 201, and second arm, 202, are both movable arms. The arms are attached to the shaft, 203, by a pair of axles, 204. The closure means, 205, is a coil spring attached to both arms. It is understood that the coil spring could be interchanged with a variety of materials including rubber bands and the like.

Figure 5:
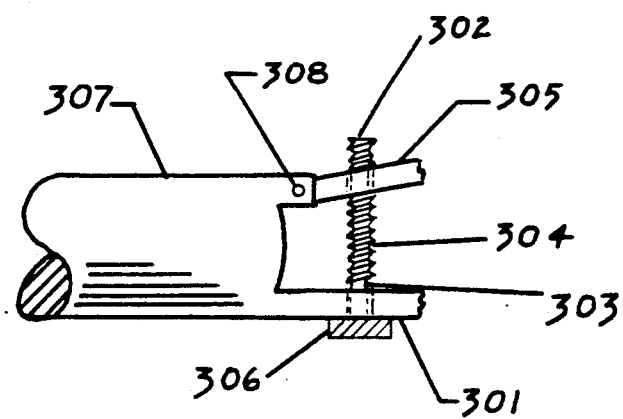
FIG. 5 shows a view of an embodiment with a screw closure means.

FIG. 5 shows an embodiment of the present invention wherein a fixed arm, 301, is fitting with a partially threaded screw, 302. The partially threaded screw has an unthreaded portion, 303, on the portion of the head, 306, which extends through the void of the fixed arm. The partially threaded screw can therefore freely rotate on its axis within a void of the fixed arm, 301. The threaded portion of the partially threaded screw, 304, extends through a movable arm, 305, and mates with a threaded bore. As the partially threaded screw is rotated the arms are pulled into closer proximity or separated depending on the direction of the rotation as would be apparent to one skilled in the art. The shaft, 307, and axle, 308, are as defined previously.

A cutting element is well known in the art as a "drill bit" of which there are a variety of suitable configurations. The first form of a suitable drill bit is a helical form, generally known as a "twist bit". Also contemplated within the teachings of the present application are split point bits, masonry bits, impact masonry bits, wood boring (paddle) bits, forstner-type bits, hole saws and others as known in the art. The composition of drill bits are known to comprise steel, zirconium nitride, cobalt, tungsten carbide, and the like. It is preferable that drill bits meet Federal Specification GGG-D-751 for strength.

The cutting element and attachment element may be of a unified construction whereby the opposing arms are integral to the end of the cutting element opposite to the cutting end. In the unified construction the shaft of the wire attachment element is integral to, and contiguous with the upper part of the cutting element. Also anticipated in the teachings is a cutting element and attachment means which can be separate but easily assembly. The method of assembly includes a matched threaded rod and threaded bore where the threaded rod is on one part of the apparatus and the threaded bore on the other. By way of example, the threaded rod could be integral to the attachment element and mated with a threaded bore in the cutting element for use. The opposite is also anticipated wherein a threaded rod is integral to the cutting element and the threaded bore is integral to the attachment element. It is preferred that the cutting element comprise a bore and the attachment element comprises a rod. In this manner a series of cutting elements can have the same bore and thread size and one size attachment means can be used interchangeably. Also anticipated by the present invention is the use of a flexible drill bit as described in U.S. Pat. No. 3,697,199.

The shaft of the wire attachment means preferably meets the same strength specifications as the cutting means when used as a unified construction. When the cutting element and attachment element are separable the attachment element may be plastic, steel, wood or any other material known in the art.

An example, which is not intended to be limiting, would be a set for pulling wires comprising two attachment means. One attachment means could have a maximum diameter of 0.25 inches and a rod of 0.125 inches with a standard thread chosen for convenience. A second attachment means could have a maximum diameter of 0.5 inches and a rod of 0.25 inches. A series of drill bits with diameters from 0.25 inches to 0.4375 inches could each have a threaded bore matching the 0.125 inch rod of the first attachment means which would allow the same attachment means to be used with a hole from 0.25 inches to 0.4375 inches. A second series of drill bits with diameters from 0.5 diameters to 0.9375 inches could have a threaded bore matching the 0.25 inch rod of the second attachment means. A single attachment means could then be used with a hole of from 0.5 inches to 0.9375 inches. In this example a wire could be pulled through a hole with a diameter of 0.25 to 0.9375 inches with only two attachment means and a suitable number of drill bits. It would be apparent to one skilled in the art that smaller and larger sizes could be envisioned in a similar fashion.

It is most desirable that the maximum diameter of the attachment means not exceed the diameter of the hole created by the cutting element.

The gripping element is any means of engaging an elongated object. Suitable means include soft rubber, plastic and the like. Preferable is a ridge roughly shaped like an inverted "V" or a series of small ridges roughly shaped like a series of inverted "V" regions. Most preferable is a series of "V" shaped grooves on each arm which grasp the elongated object therebetween when the opposing arms are in close proximity. Also anticipated is a grid pattern, an irregular surface, or regularly scored surface which would insure the wire does not slip between the opposing arms in use.

It is an important aspect of the present invention that the opposing arms are capable of grasping and releasing an elongated object. This is preferably accomplished when at least one arm is pivotally attached to the shaft. The axis of pivot is preferably perpendicular to the long axis of the shaft and the direction of pull in most embodiments. The pivotal attachment can be in the form of an axle attached to recessed in the rod or a hinge member as known in the art. The axle can be a rod, a screw or the like.

The closure means is suitable to maintain the opposing arms in a grasping configuration until released. The closing means can be in the form of a spring, a sleeve, or a threaded member. A threaded member can be incorporated such that turning the threaded member urges the arms apart and together. A spring element is attached in a manner capable of urging the opposing arms together. As the arms are separated to insert or release the wire the spring is stressed and upon relaxation the arms are brought into close proximity. One embodiment is a spring steel sheet mounted parallel to the arm such that a relaxed spring corresponds to the arm being in operative contact with the opposing arm. Another embodiment corresponds to a coil spring attached to both opposing arms. As the arms are separated the spring is stretched. After inserting or removing the wire the spring returns the opposing arms into operative contact. A threaded member can be incorporated which passes through a bore of both arms. The bore of one arm allows free rotation of the threaded member and the bore of the second arm is threaded to match the threads of the threaded member. In this manner rotation of the threaded member either pulls the arms into closer proximity or allows the arms to separate. It si also envisioned that both arms could have threaded bores with the full length of the threaded member comprising threads. A sleeve is also envisioned as an embodiment of the present invention. The sleeve is suitably sized to slide over the shaft to allow the opposing arms to separate. Sliding the sleeve over the opposing arms forces them into operative contact to grasp the wire therebetween.

The shaft of the attachment means is generally round. Other shapes such as square, pentagonal, hexagonal, octagonal and the like are suitable. If the drill bit and attachment means are of a unified construction a polygon is preferred to insure tight mating with the chuck of a standard drill motor.

The wire is any single or multiple strand wire typically used in buildings. Also envisioned is the use of the present invention with other elongated objects including wire, rope, string, conduits, pipes and the like.

It is also anticipated that the wire attachment element can be attached to a shaft which is not a cutting means. In this embodiment the full extent of pre-drilled hole is located with a locator rod. A wire attachment means is then integral to the end of the locator rod and the operation of wire pulling commences as outlined throughout the current specification. Also anticipated is a lengthening rod wherein one end is attached to the cutting element and the other is attached to the wire attachment element.

In operation the present invention is employed by the following steps:

a) a hole is drilled by attaching the cutting element to a drill motor as known in the art;

b) the drill motor is removed from the cutting element without removing the cutting element from the hole;

c) if applicable, the wire attachment means is attached to the cutting element;

d) the wire to be pulled is coupled with the attachment means and secured by the closure means;

d) the cutting element is pulled through the wall until the wire is clearly through the wall;

e) the wire attachment means is decoupled from the wire.

I claim:

1. A wire puller apparatus comprising:
   a cutting element;
   a wire attachment means capable of coupling with said cutting element;
   wherein said wire attachment means comprises a shaft with at least two opposing arms attached thereto;
   a means for reversibly engaging said opposing arms with an elongated object.

2. The wire puller apparatus recited in claim 1 wherein said cutting element and said wire attachment means are coupled together by a threaded rod secured to one of said cutting element or said attachment means and a matching threaded bore on the other of said cutting element or said attachment means.

3. The wire puller apparatus recited in claim 1 wherein said opposing arms are pivotally attached to said shaft.

4. The wire puller apparatus recited in claim 1 wherein said closure means is chosen from the set consisting of spring steel sheet, sleeve, coil spring and partially threaded screw.

5. The wire puller apparatus recited in claim 4 wherein said closure means is spring steel sheet.

6. The wire puller apparatus recited in claim 4 wherein said closure means is a sleeve.

7. The wire puller apparatus recited in claim 6 wherein said closure means is a sleeve and the interior of said sleeve and exterior of said attachment means comprises mating threads.

8. An elongated rod comprising a cutting end and an attachment end;
   said cutting end comprises a drill bit;
   said attachment end comprises a first arm and a second arm wherein said first arm and said second arm are opposing;
   said attachment end further comprises a closure means for reversibly influencing said first arm and said second arm into close proximity wherein an elongated object is grasped therebetween.

9. The elongated rod recited in claim 8 wherein said closure means is chosen from the set consisting of spring steel sheet, sleeve, coil spring and partially threaded screw.

10. The elongated rod recited in claim 9 wherein said closure means is spring steel sheet.

11. The elongated rod recited in claim 9 wherein said closure means is a sleeve.

12. The elongated rod recited in claim 11 wherein said closure means is a sleeve and the interior of said sleeve and exterior of said attachment means comprises mating threads.

13. A wire puller apparatus comprising:
a shaft capable of coupling with a cutting element;
a pair of opposing arms attached to said shaft wherein said opposing arms grasp an elongated object when in close proximity and release said elongated object when in distant proximity;
a closure element for influencing said opposing arms together.

14. The wire puller apparatus recited in claim 13 wherein said closure means is a sleeve.

15. The wire puller apparatus recited in claim 14 wherein said closure means is a sleeve and the interior of said sleeve and exterior of said attachment means comprises mating threads.

* * * * *